(No Model.)
C. TEMME.
COOKING STOVE.
No. 243,739. Patented July 5, 1881.
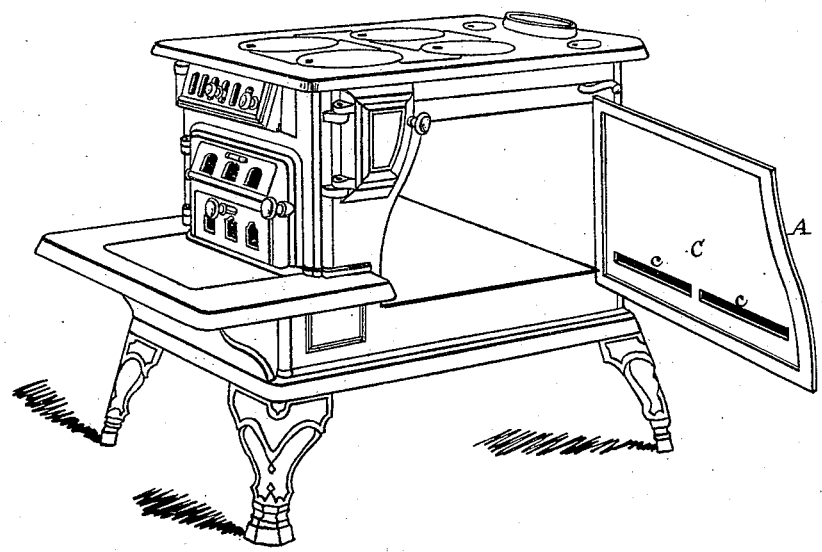
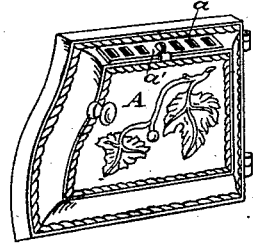
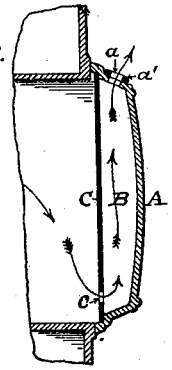
ATTEST:
H. H. Liemke.
Robt Burns.
INVENTOR:
Christian Temme

UNITED STATES PATENT OFFICE.

CHRISTIAN TEMME, OF ST. LOUIS, MISSOURI.

COOKING-STOVE.

SPECIFICATION forming part of Letters Patent No. 243,739, dated July 5, 1881.

Application filed April 19, 1881. (No model.)

*To all whom it may concern:*

Be it known that I, CHRISTIAN TEMME, a citizen of the United States, residing at St. Louis, in the State of Missouri, have invented a certain new and useful Improvement in Cooking-Stoves, of which the following is a specification.

The difficulty heretofore met with in baking with the ordinary cooking stove or range has been that the article undergoing the baking process is overbaked at the center, while the sides next to the oven-doors are not sufficiently baked. This is owing to the unequal distribution of the heat in the oven. To overcome in a measure these defects, it is usual to reverse or turn the pans containing the article being baked, in order to bring the portions that were next to the oven-doors along the center of the oven, so that they will be exposed to the same heat that the inner portion of the article had been previously exposed to. This mode of baking requires constant care and attention in order to prevent overbaking or burning of the article being baked.

The object of my invention is to provide a means for causing an equal distribution of the heat throughout the oven-chamber of a cooking stove or range, and thus overcome the uneven baking consequent to the ordinary construction of cooking-stove; and to this end my invention consists in forming the oven door or doors of a cooking stove or range double, so as to form a chamber within the door, which is provided with inlet-opening near the bottom of the oven and outlet-opening near the top of the door, the construction being such that the heat, &c., in the oven will be drawn downward to the sides of the oven as it escapes, and thus evenly and effectually heat such portion of the oven, as will hereinafter more fully appear.

In the accompanying drawings, in which similar letters of reference indicate like parts in the several views, Figure 1 is a perspective view of a cooking-stove to which my improvement is applied. Fig. 2 is a detail transverse section, and Fig. 3 is a detail perspective view of the oven-door.

Referring to the drawings, A represents the oven-door of a cooking stove or range, formed with a chamber, B, the walls of which are formed by the door proper and a plate or diaphragm, C. The inlet $c$ to the chamber B is formed in the plate C near the bottom of the oven, while the outlet-opening $a$ is formed in the door proper near its top, and may be provided with a register or slide, $a'$, so as to regulate the discharge of the heated air, gases, &c., from the oven.

In use the heated gases, &c., formed in the baking process will descend to the sides of the oven and evenly heat the same before they can pass into the chamber B and escape, by which means I am enabled to evenly and perfectly perform the baking operation without the necessity of turning or reversing the article, as is usual with the ordinary construction of oven.

Having thus fully described my said invention, what I claim as new, and desire to secure by Letters Patent, is—

1. A cooking stove or range having its door or doors provided with a chamber, B, and inlet and outlet openings $c$ $a$, situated as described, all substantially as and for the purpose set forth.

2. A cooking stove or range having its door or doors provided with a chamber, B, inlet and outlet openings $c$ $a$, and register $a'$, substantially as described, and for the purpose set forth.

Signed at St. Louis, State of Missouri, this 16th day of April, 1881.

CHRISTIAN TEMME.

In presence of—
ROBERT BURNS,
H. LENTZ.